May 10, 1966 K. W. STALKER 3,250,491
HYDRAULIC CABLE REEL DRIVE CIRCUIT
Filed Sept. 21, 1964 2 Sheets-Sheet 1
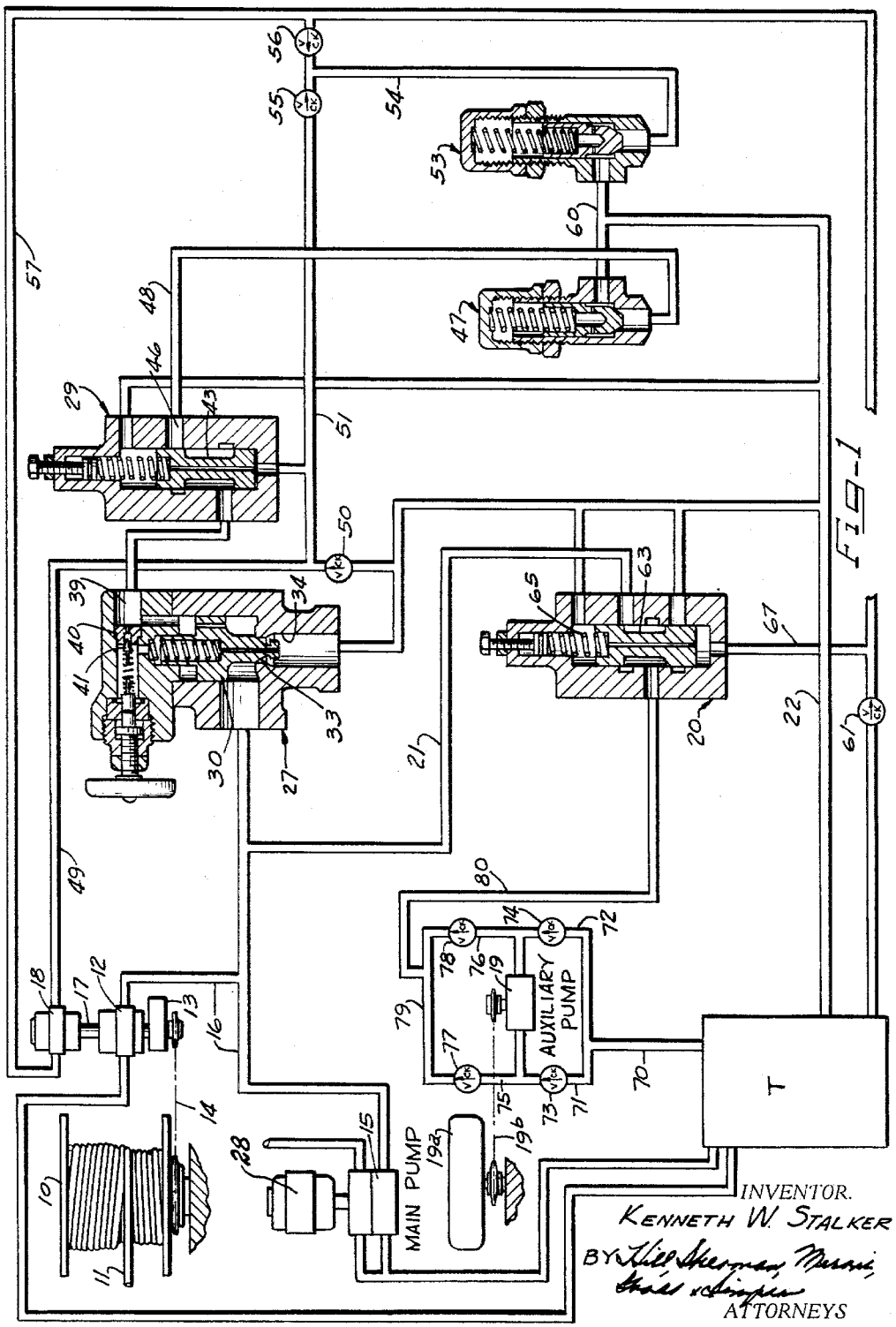
INVENTOR.
KENNETH W. STALKER
BY
ATTORNEYS

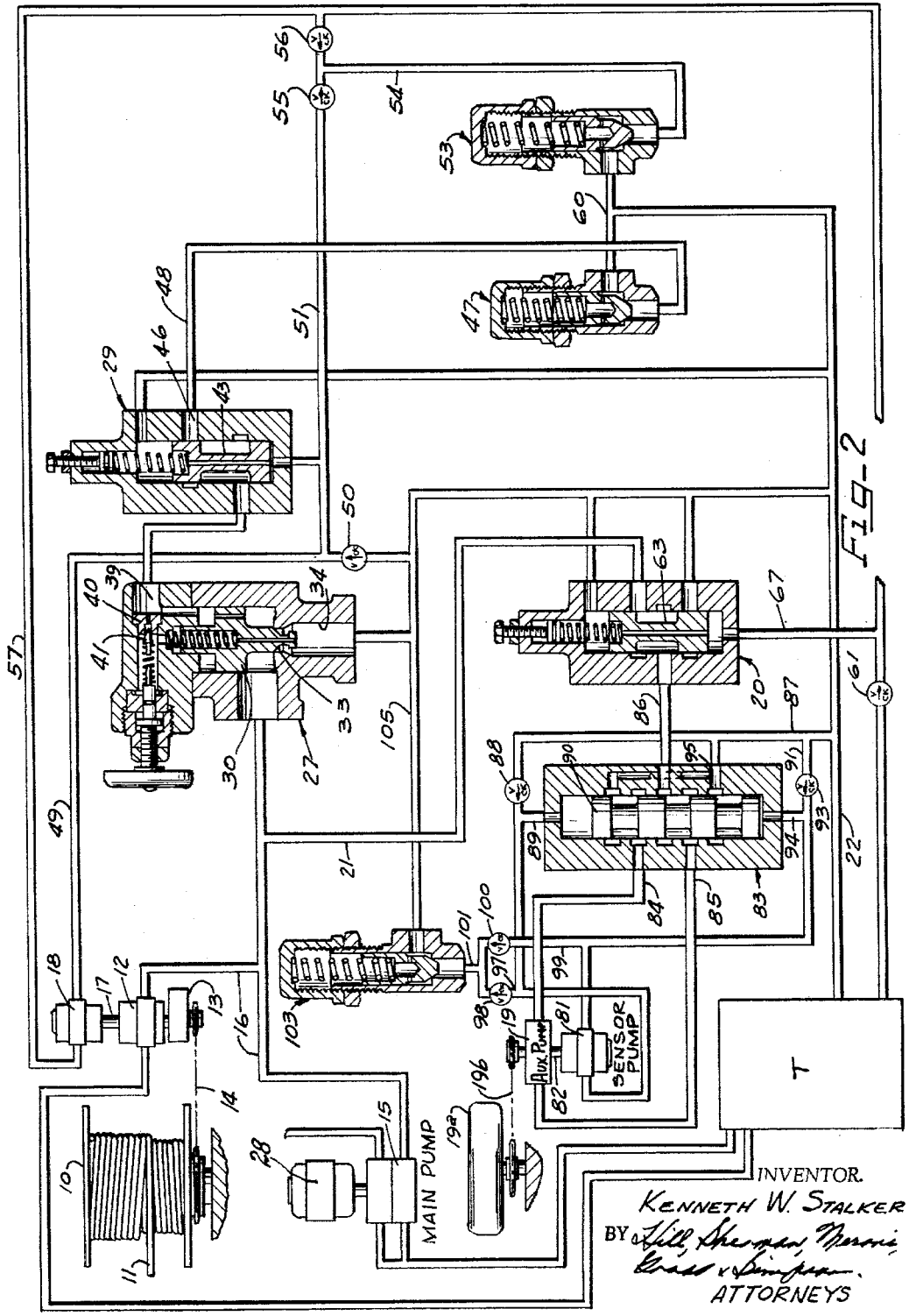

United States Patent Office 3,250,491
Patented May 10, 1966

3,250,491
HYDRAULIC CABLE REEL DRIVE CIRCUIT
Kenneth W. Stalker, Springdale, Ark., assignor to Goodman Manufacturing Company, Chicago, Ill., a corporation of Illinois
Filed Sept. 21, 1964, Ser. No. 397,683
11 Claims. (Cl. 242—86.51)

This invention relates to improvements in the hydraulic drives and control circuits for cable reels and the like.

A principal object of the invention is to establish a desired tension on a cable paid off or wound on a cable reel supplying electric power to a vehicle, such as a shuttle car, by the use of a sensor sensing the direction of rotation of the cable reel and by the use of main and auxiliary pumps supplying hydraulic fluid under pressure to the cable reel during the winding operation, in which one pump is connected to constantly supply fluid under pressure to the cable reel motor during winding and unwinding and the other pump is driven in accordance with the speed of travel of the vehicle to supply a varying volume of fluid to the cable reel motor increasing as the requirement for winding increases, and in which the pump driven in accordance with the speed of the vehicle is unloaded under the control of the sensor when the reel is paying off cable.

A further object of the invention is to provide a hydraulic drive system for driving a cable reel, supplying electric power to a vehicle, in which a pump driven by the vehicle wheels is provided to supply power to the cable reel motor during winding and in which a novel form of valve arrangement is connected in the supply and discharge sides of the pump, to assure the discharge of fluid from the pump in the same direction regardless of the direction of rotation of the pump and direction of travel of the vehicle.

Still another object of the invention is to provide a novel form of hydraulic drive system for a cable reel supplying electric power to a vehicle on which the cable reel is mounted, in which a pump supplying hydraulic fluid to the cable reel drive motor is driven by a wheel of the vehicle, in which a sensor senses the direction of rotation of the wheel and pump, and in which a novel form of valve arrangement operated by pressure generated by the sensor assures the supply of hydraulic fluid under pressure by the wheel driven pump in the same direction, regardless of the direction of rotation of the pump.

Still another object of the invention is to provide an improved form of hydraulic drive for cable reels and the like in which a main low capacity pump and an auxiliary high capacity pump supply fluid under pressure to the cable reel drive motor during winding, in which the main pump is constantly driven and the auxiliary pump is wheel driven and is operated under the control of a reel direction sensor, to return its fluid to tank during the unwinding operation, and in which a simple and novel form of wheel direction sensor and flow valve arrangement is provided in the supply to and discharge from the auxiliary pump, to assure the discharge of fluid under pressure from the auxiliary pump regardless of its direction of rotation.

These and other objects of the invention will appear from time to time as the following specification proceeds and with reference to the accompanying drawings wherein:

FIGURE 1 is a diagrammatic view illustrating a form of fluid pressure reel operating and control circuit arranged in accordance with the principles of the present invention; and FIGURE 2 is a diagrammatic view somewhat similar to FIGURE 1 and illustrating a modified form in which the invention may be embodied.

In the embodiment of the invention illustrated in FIGURE 1 of the drawings, I have shown a hydraulic circuit for driving a cable reel 10 to wind cable 11 thereon and for controlling the paying off of cable from the reel to maintain a substantially constant tension on the cable during winding and unwinding of the cable and during stalling of the reel. The reel may be mounted on a mine vehicle, such as a shuttle car, and is adapted to move toward and away from and past a fixed nip (not shown) detachably connected to a source of electric power, for driving the vehicle during the operation of transferring a load of material from a loading to a discharge station. The fluid control circuit effecting winding in and controlling the paying off of cable from the reel 10 is generally similar to that shown and described in an application filed by Emil J. Hlinsky, Herman Linkowski and Melvin G. Carlson concurrent with the filing of the present application and entitled, "Automatic Regulator for Cable Reel," and designated by Serial No. 397,684.

The present invention is directed to a modification of the hydraulic circuit of the foregoing application, in which a main low capacity pump 15 is provided to supply hydraulic fluid under pressure to a cable reel drive motor 12 during winding in and paying off of cable from the reel and during stalling of the reel, while an auxiliary high capacity pump 19 is driven by a wheel 19a of the vehicle through a chain and sprocket drive 19b. The auxiliary pump 19, therefore, is only driven when the vehicle is travelling and the output of the pump increases as the speed of travel of the vehicle increases. The output of the auxiliary pump, therefore, matches the fluid requirements of the fluid pressure operated cable reel drive motor 12, to draw cable in on the cable reel and maintain the required tension on the cable.

The system generally includes a positive drive connection from the reel motor 12 to the cable reel 10, which is diagrammatically shown as being in the form of a speed reducer 13, driven from the reel motor 12 and driving a chain and sprocket drive 14, having driving connection with the reel.

The main pump 15 is driven from a suitable motor 28 and is connected with the reel motor 12 through a pressure line 16, which also has fluid connection with a pilot-operated relief valve 27 upstream of the point of connection of a pressure line 21 to the pressure line 16, and supplied with fluid under pressure from the auxiliary pump 19 under the control of a pilot-operated unloading valve 20.

A sensor 18 is driven from a drive shaft 17, shown as being a motor shaft for the reel drive motor 12. The sensor 18 may be in the form of a pump, like the motor 12, and supplies the pressure to move a valve spool 63 of the pilot-operated unloading valve 20 into position to assure the supply of fluid under pressure from the auxiliary pump to the reel motor 12, during the operation of winding in cable on the reel 10. The sensor 18 also supplies fluid under pressure during paying off of the cable, through a line 49 supplying the pressure to move a valve spool 43 of a pilot-operated diverting valve 29, into position to accommodate the flow of fluid from the pilot-operated relief valve 27 through said diverting valve back to tank through a low pressure relief valve 47 connected with a tank or return line 22.

The pilot-operated relief valve 27 is shown as being of a conventional form having a balanced piston 30 and a valve 33 connected thereto and cooperating with a port 34 to dump fluid to the tank line 22 upon the opening of said valve. A port 39 on the opposite side of the piston 30 from the valve 33 has fluid connection with the pilot-operated diverting valve 29. The high pressure setting of the pilot-operated relief valve 27 is controlled by a poppet valve 41 cooperating with a seat 40 in communication with the port 39. In a system like the present system, the pilot-operated relief valve may be set by the poppet valve 41 to relieve pressure at a high pressure range of substantially 500 p.s.i. or higher.

When the sensor pump 18 is driven by the reel 10, fluid under pressure will be delivered through the pressure line 49 leading to a tank or return line 22 and having a check valve 50 therein, upstream of the point of connection of the discharge from the pilot-operated relief valve to the line 49. Fluid under pressure, blocked from flowing to tank by said check valve, will then flow through a pressure line 51 past a check valve 55 therein through a pressure line 54 leading to a back pressure valve 53. Pressure is held in the line 51 by check valve 56 on the opposite side of the point of connection of the line 54 to the line 51, from the check valve 55. The back pressure valve 53 is set to discharge fluid to a return line 60 at a predetermined pressure, which may be in the order of 150 pounds per square inch. The back pressure valve 53 thus governs the pressure in the line 51, and the pressure of operation of the pilot-operated diverting valve 29, to release fluid to the low pressure relief valve 47 through a pressure line 48.

The low pressure relief valve 47 thus governs the pressure of fluid in the port 39 when the spool 43 of the valve 29 is in position to open the port 46 to the line 48 and determines the low pressure operating range of the pilot-operated relief valve 27 during the paying off of cable from the reel 10.

When the motor 12 is driving the reel 10, during the reeling operation, the sensor pump 18 is supplied with fluid under pressure from the tank and line 22 through the check valve 50 and line 49 and discharges fluid under pressure through a pressure line 57. The passage of fluid under pressure through the pressure line 57 back to tank is blocked by a check valve 61.

Fluid will also pass from the pressure line 57 through the check valve 56 to the pressure regulator valve 53, which will govern the pressure in the pressure line 57 and provide sufficient back pressure to move the spool 63 of the pilot-operated diverting valve 20 into the position shown in FIGURE 1, and to hold the spool in this position to effect the supply of fluid under pressure from the pump 19 through the pressure line 21 to the pressure line 16 and reel motor 12 during the winding operation.

The circuits so far described are thus like those of the companion application Serial No. 397,684, filed herewith.

The auxiliary pump 19 driven by the wheel 19a through the chain and sprocket drive 19b is driven to supply fluid under pressure to the motor 12 during the winding operation, as the vehicle is travelling toward the nip connecting the cable to a source of power. As the vehicle passes the nip and continues to travel in the same direction, cable will be unwound from the reel 10, but the pump 19 will continue to be driven in the same direction and during this unwinding operation will be unloaded by operation of the pilot-operated unloading valve 20.

As the vehicle moves past the nip and during reverse travel of the vehicle toward the nip, the direction of rotation of the auxiliary pump 19 will be reversed. Cable, however, will be wound on the reel 10 as the vehicle approaches the nip, and the auxiliary pump 19 will supply fluid under pressure to the reel motor 12 through the unloading valve 20 and pressure lines 21 and 16.

The supply and discharge system of fluid under pressure to and from the pump 19 must thus be so arranged that the pump 19 will supply fluid under pressure to the valve 20 in the same direction, as long as the reel is winding in cable, regardless of the direction of rotation of said pump. The fluid system to the pump 19 is shown in FIGURE 1 as including a suction line 70 leading from tank and connected to branch suction lines 71 and 72, providing a parallel intake circuit to the pump 19. The line 71 supplies fluid to the pump 19 in one direction of rotation of said pump, and the line 72 supplies fluid to the pump 19 in the opposite direction of rotation of said pump. A check valve 73 is in the line 71 and is set to accommodate the passage of fluid through the line 71 to the intake of the pump 19 and to prevent the back flow of fluid through said line back to tank. A similar check valve 74 is provided in the line 72. Pressure lines 75 and 76 lead from the pump 19, one of said lines being a pressure line in one direction of rotation of said pump and the other of said lines being a pressure line in the opposite direction of rotation of said pump. The respective pressure lines 75 and 76 have check valves 77 and 78 therein, set to accommodate the flow of fluid through either of said pressure lines to a connecting line 79, but to block the back flow of fluid through the other, of the lines 75 or 76. The connecting line is connected with the pilot-operated unloading valve 20 through a pressure line 80.

Fluid under pressure will thus be supplied to the pressure line 80 through the suction lines 70 and 72, check valve 74 to the intake of the pump 19 and out the discharge outlet of said pump through the pressure line 75, check valve 77 and connecting line 79 in one direction of rotation of the auxiliary pump 19. In the opposite direction of rotation of said pump, fluid under pressure will be supplied to the pressure line 80 through the intake lines 70 and 71, check valve 73 to the intake of the pump and through the discharge of the pump and pressure line 76, check valve 78 to the connecting line 79.

The pump 19 will thus supply fluid under pressure to the pressure line 80 valve 20 and pressure lines 21 and 16 to the fluid motor 12 regardless of the direction of rotation of said pump as long as cable is being wound on the reel 10.

Thus when travelling toward the nip and drawing in cable on the reel 10, the wheel 19a will drive the pump 19, and pressure in the line 57 derived from the sensor pump 18 will move the valve spool 63 against its spring 65 in position to direct pressure from the pump 19 to the pressure line 16 and motor 12. As the speed of travel of the vehicle increases, the pumping capacity of the pump 19 will be increased with a resultant supply of an increasing volume of fluid and pressure to the motor 12, to increase the speed thereof. The auxiliary pump 19 is thus driven to supply fluid under pressure to the motor 12 responsive to the speed of travel of the vehicle and the need for increased winding speed of the reel 10.

When the vehicle is standing, the auxiliary pump 19 is not in operation and the entire capacity of the pump 15, which is of a substantially lower capacity than the pump 19, is discharged through the pilot-operated relief valve 27, at the high pressure setting of said valve. The pressure applied to the reel motor 12 by the pump 15 holds the cable in a snug condition.

During the paying off of cable, the pump 19 may be driven in the same direction as during winding, where the vehicle moves past the nip connecting the cable to a source of power. The pump 19 may also be driven in a reverse direction, where the vehicle reverses its travel and moves away from the nip. In either direction of rotation of the pump 19, the sensor pump 18 will reverse its direction of travel, due to reversal in direction of travel of the reel 10, and relieve pressure from the bottom of the spool 63 and accommodate the spring 65 to move the spool to unload the pump 19 to tank. At the same time the sensor pump 18 will draw in fluid from the line 57 past the suction check valve 61 and pressurize the bottom of the spool 43 and unbalance the piston 30, to accommodate the relief of fluid from the pressure line 16 under the control of the low pressure relief valve 47, at a low pressure range, which may be in the order of 200 p.s.i. The auxiliary high capacity pump 19 being unloaded, only the output of the main low capacity pump 15 and the output of the reel motor 12, driven as a pump from the reel, are fed into opposite ends of the pressure line 16 and will be discharged through the reilef valve 27 and port 46 of the valve 29, at the low pressure setting of said relief valve.

In the form of the invention illustrated in FIGURE 2, the reel control circuit is generally the same as in the form of the invention illustrated in FIGURE 1, and the general principles of the two circuits are the same. The same part numbers will, therefore, be applied to the same parts as in FIGURE 1 and the description of the entire circuit need not be repeated herein.

In FIGURE 2, the direction of fluid flow to the pilot-operated unloading valve 20 is maintained in the same direction regardless of the direction of rotation of the auxiliary pump 19, under the control of a sensor pump 81, driven from a shaft 82 driving the pump 19 from the wheel 19a.

The sensor pump 81 supplies fluid under pressure to either end of a four-way spool valve 83 to shift a spool 90 of the valve to maintain either of lines 84 or 85 in pressure communication with a pressure line 86, connected with the inlet to the pilot-operated unloading valve 20, depending upon which line is the pressure line, in accordance with the direction of rotation of the pump 19.

The sensor pump 81 is connected with the tank line 22 through an intake line 87. The line 87 leads to one end of the sensor pump 81 and may be the intake or pressure line for said pump, depending upon the direction of rotation of said pump. The line 87 has a check valve 88 therein, upstream of a pressure line 89 leading into one end of the four-way valve 83. The pressure line 89 supplies pressure to shift the spool 90 of the four-way valve 83 into position to afford direction communication between the line 85 and the pressure line 86 connected with the pilot-operated unloading valve 20, as shown in FIGURE 2.

A line 91 leads from the intake line 87 and is connected with the opposite end of the sensor pump 81 from the line 87, and may be an intake or pressure line depending upon the direction of rotation of the sensor pump. A check valve 93 is connected in the line 91, upstream of a pressure line 94, leading to the opposite end of the valve spool 90 from the line 89, and supplying pressure to move the valve spool 90 into position to accommodate the flow of fluid under pressure from the line 84 to the pilot-operated unloading valve 20 through the line 86, and the intake of fluid to tank through the line 85, the chamber of the four-way valve 83 and a port 95, connected with the line 87.

The line 87 has a branch line 97 leading therefrom downstream of the check valve 88 when the line 87 is supplying fluid to the sensor pump 81, and having a check valve 98 therein. The line 91 also has a branch line 99 leading therefrom, downstream of the check valve 93 when the line 91 is supplying fluid to the sensor pump 81, and having a check valve 100 therein. The lines 97 and 99 supply pressure through a line 101 to a back pressure valve 103, like the back pressure valve 53, and maintain sufficient pressure in either of the pressure lines 89 or 94 leading to opposite ends of the valve spool 90, to shift the valve spool 90 in the required direction in accordance with the direction of rotation of the sensor pump, and to hold the valve spool in its shifted position until reversal in the direction of rotation of the sensor pump.

The check valves 98 and 100 and back pressure valve 103 thereby maintain pressure in either of the lines 89 or 94 at the pressure setting of the back pressure valve 103. A return line 105 connects the back pressure valve 103 to the tank line 22.

It may be seen that in this form of the invention, the four-way valve 83 operated by pressure supplied at either end thereof in accordance with the direction of rotation of the sensor pump 81, positively connects either line 84 or 85, leading from the auxiliary pump 19, to supply fluid under pressure to the pilot-operated unloading valve 20 and reel motor 12, during the operation of drawing in cable by said reel, when the vehicle is travelling toward the point of connection of the nip on the end of the cable, to a source of power supply.

As in the form of the invention illustrated in FIGURE 1, the main pump 15 is continuously driven to supply fluid under pressure to the reel motor 12, while the auxiliary pump 19, driven by the wheel 19a augments the fluid supplied to the reel motor 12 by the main pump in accordance with the need for fluid under pressure, to maintain the tension of the cable to a predetermined value.

During unwinding the direction of rotation of sensor pump 18 will be reversed and fluid will be drawn to the sensor pump through suction check valve 61 and line 57. Spring 65 has then moved valve spool 63 to unload the auxiliary pump 19 through the unloading valve 20.

The line 49 leading from the sensor 18 will then be pressurized and fluid under pressure will flow through the lines 51 and 54 and through the back pressure valve 53 which will provide sufficient pressure to move the valve spool 43 against the spring and accommodate the release the fluid under pressure through the port 46, line 48 and low pressure relief valve 47 and thereby establish the low pressure setting of the relief valve 27. The main pump will then discharge its output against the output of the reel motor 12 driven as a pump from the reel 10, through the valve 33 and port 34 of the pilot-operated relief valve 27 and through the diverting valve 29 and low pressure relief valve 47.

While I have herein shown and described one form in which the invention may be embodied, it may readily be understood that various variations and modifications in the invention may be attained without departing from the spirit and scope of the novel concepts thereof.

I claim as my invention:

1. In a fluid pressure system for controlling the drawing in and paying out of a flexible member supplying electric power to a wheel mounted vehicle,
   a fluid pressure motor supplying the power to draw in the member,
   said motor being driven as a pump during paying out of the member,
   a main pump,
   an auxiliary pump,
   a fluid pressure connection from said main pump to said fluid pressure motor,
   an unloading valve,
   a fluid pressure connection from said auxiliary pump to said fluid pressure motor through said unloading valve,
   means sensing the direction of rotation of said motor and effecting operation of said unloading valve to effect the supply of fluid under pressure to said fluid pressure motor from both of said pumps during operation of said fluid pressure motor, to draw in the flexible member, and to unload said auxiliary pump through said unloading valve when said fluid pressure motor is driven by said flexible member, an electric motor for driving said main pump, and wheel operated drive mechanism driving said auxiliary pump in accordance with the speed of travel of the vehicle and the requirement for cable reel torque necessary to draw in cable on the reel.

2. A fluid pressure system in accordance with claim 1, wherein the auxiliary pump is a reversible pump and is supplied with fluid under pressure in each direction of rotation thereof, and has fluid pressure connection with said unloading valve, and wherein the fluid pressure connection from said auxiliary pump to said unloading valve includes valve means directing fluid under pressure to said unloading valve in the same direction regardless of the direction of rotation of said auxiliary pump.

3. A fluid pressure system in accordance with claim 1, in which the main pump is a relatively low capacity pump and the auxiliary pump is a relatively high capacity reversible pump, in which a pressure line leads to the unloading valve, wherein fluid pressure connections are provided from opposite ends of said auxiliary pump to said pressure line, and wherein said fluid pressure connections include a valve shiftable in accordance with the direction of rotation of said auxiliary pump to direct fluid under pressure from either of said fluid pressure connections to said pressure line.

4. A fluid pressure system in accordance with claim 1, wherein a pressure line leads to the unloading valve, wherein fluid pressure connections are provided from opposite ends of said auxiliary pump to said pressure line, wherein intake connections are provided to opposite ends of said auxiliary pump, and wherein valve means are provided in said intake connections and said fluid pressure connections, to direct the flow of fluid under pressure to said pressure line in the same direction regardless of the direction of rotation of said auxiliary pump.

5. A fluid pressure system in accordance with claim 4, wherein the valve means comprise a check valve in each intake connection to said auxiliary pump position to block the back flow of fluid through said intake connections, and check valves in said fluid pressure connections from said auxiliary pump, positioned to block the back flow of fluid to the auxiliary pump through said fluid pressure connections.

6. A fluid pressure system in accordance with claim 1, wherein a pressure line leads to the unloading valve and supplies fluid under pressure to said valve to be directed to said reel motor or unloaded, depending upon whether the reel is drawing in or paying out cable, wherein fluid connections are provided from opposite ends of said auxiliary pump of said pressure line, one of said connections being a pressure connection and the other connection being an intake connection, depending upon the direction of rotation of said auxiliary pump, wherein the connection between said fluid connections and said pressure line includes a pressure operated shiftable valve, and wherein a reversible sensor pump driven with said auxiliary pump senses the direction of rotation of said pump and supplies the pressure to shift said valve into the required position to supply pressure to said pressure line and pilot-operated unloading valve in accordance with the direction of rotation of said auxiliary pump.

7. A fluid pressure system in accordance with claim 6, wherein a back pressure valve having fluid connection with opposite ends of said sensor pump cooperates with said sensor pump, to provide the pressure to operate said valve in either direction of movement thereof, in accordance with the direction of rotation of said sensor pump.

8. In a cable reel mechanism for a vehicle adapted to be supplied with electric power from a fixed nip and adapted to move toward and away from and past said nip, characterized by a cable reel mounted on said vehicle for movement therewith, a cable wound on said reel and connected to said nip for providing a power connection from said nip to said vehicle and adapted to be wound upon or payed off of said reel when said vehicle moves toward or away from said nip, a tank, a constantly driven main pump with its input connected to said tank, a fluid motor-pump unit connected to the main pump by a main pressure line and drivably connected to said reel and driven in one direction by pressure fluid from said pump as a fluid motor for driving said reel to wind cable thereon, and driven in the opposite direction as a pump responsive to movement of said reel in a direction to pay off cable therefrom, control valve means for controlling the pressure of said pressure fluid in said main pressure line, a reversible auxiliary pump, an auxiliary pressure line connecting the auxiliary pump to said main pressure line, an unloading valve in said auxiliary pressure line operable between a supply position in which it directs fluid from the auxiliary pump to the main pressure line and a bypass position in which it directs fluid from the auxiliary pump to tank, a reel direction sensor supplying the pressure to operate said unloading valve into its supply position, the improvements comprising:

wheel operated drive mechanism, driving said auxiliary pump in accordance with the speed of travel of the vehicle, and fluid pressure connections from said auxiliary pump to said unloading valve having valve means therein, automatically directing fluid to said unloading valve in the same direction regardless of the direction of rotation of said auxiliary pump.

9. A fluid pressure system in accordance with claim 8, wherein the fluid pressure connection from the auxiliary pump to the unloading valve include lines leading from opposite ends of said auxiliary pump and joining to supply fluid under pressure to said unloading valve, check valves in each of said lines blocking the back flow of fluid to said auxiliary pump upon reversal of the direction of rotation thereof, and intake lines leading to opposite ends of said auxiliary pump and having check valves therein blocking the back flow of fluid upon a reversal in the direction of rotation of said auxiliary pump.

10. A fluid pressure system in accordance with claim 8, wherein a shiftable valve directs fluid under pressure from said auxiliary pump to said unloading valve in each direction of rotation of said auxiliary pump, and wherein a sensor pump driven with said auxiliary pump senses the direction of rotation of said auxiliary pump and supplies the pressure to shift said shiftable valve.

11. A fluid pressure system in accordance with claim 8, wherein a pressure operated four-way valve is provided to conduct fluid to either end of said auxiliary pump and to conduct fluid under pressure from either end of said auxiliary pump to said pressure operated unloading valve in accordance with the direction of rotation of said auxiliary pump, wherein a reversible sensor pump driven by said auxiliary pump senses the direction of rotation of said auxiliary pump and has fluid connection with said pressure operated four-way valve to shift said valve in accordance with the direction of rotation of said auxiliary pump, to supply fluid under pressure to said unloading valve in each direction of rotation of said auxiliary pump, and wherein a back pressure valve is connected in the fluid pressure connections from said sensor pump to opposite ends of said shiftable valve to provide the pressure for shifting said valve in accordance with the direction of rotation of said auxiliary pump.

References Cited by the Examiner
UNITED STATES PATENTS
2,467,238  4/1949  Slomer _____ 242—86.51

MERVIN STEIN, *Primary Examiner.*

N. L. MINTZ, *Assistant Examiner.*